United States Patent [19]

Daniele et al.

[11] Patent Number: 4,837,636
[45] Date of Patent: Jun. 6, 1989

[54] MOTION SENSOR FOR SENSING THE RELATIVE POSITION AND VELOCITY OF A RECORDING MEMBER

[75] Inventors: Joseph J. Daniele, Pittsford; Robert M. Lofthus, Honeoye Falls, both of N.Y.

[73] Assignee: Xerox Corporation, Stamford, Conn.

[21] Appl. No.: 111,400

[22] Filed: Oct. 22, 1987

[51] Int. Cl.$^4$ .......................... G01D 9/42; H04N 1/23
[52] U.S. Cl. ................................. 358/300; 346/108; 358/293
[58] Field of Search .............. 358/296, 300, 302, 293; 346/108

[56] References Cited

U.S. PATENT DOCUMENTS

| | | | |
|---|---|---|---|
| 3,914,047 | 10/1975 | Hunt, Jr. et al. | 355/16 |
| 4,017,014 | 4/1977 | Luscher | 226/45 |
| 4,316,199 | 2/1982 | Greenig | 358/300 |
| 4,360,195 | 11/1982 | Schon et al. | 271/3 |
| 4,438,917 | 3/1984 | Janssen et al. | 271/227 |
| 4,478,405 | 10/1984 | Eertink et al. | 271/227 |
| 4,518,862 | 5/1985 | Dorn | 250/561 |
| 4,527,069 | 7/1985 | Pfizenmaier | 250/548 |
| 4,668,982 | 5/1987 | Tinnerino | 358/106 |
| 4,761,662 | 8/1988 | Yoshimoto | 346/108 |

Primary Examiner—E. A. Goldberg
Assistant Examiner—Mark Reinhart
Attorney, Agent, or Firm—Frederick E. McMullen

[57] ABSTRACT

A xerographic copying/printing machine in which the photoreceptor has a row of discrete image marks along one side margin, a CCD type array spaced opposite to and aligned with the row of photoreceptor marks to provide successive blocks of image signals representing the instantaneous pattern of marks viewed by the array on each scan, a light bar spaced opposite the other side of the photoreceptor and aligned with the array for illuminating the array sensors through the marks, and a circuit for converting the image signal output of the array to clock signals representative of photoreceptor speed and position.

7 Claims, 7 Drawing Sheets

MOTION SENSOR FOR SENSING THE RELATIVE POSITION AND VELOCITY OF A RECORDING MEMBER

The invention relates to a motion sensor for sensing the relative position and velocity of an object, and more particularly, to a motion sensor for sensing the position and velocity of the recording member in copying/printing machines for control purposes.

Copying and printing machines require that the image developed on the machine photoreceptor be registered accurately with the copy substrate material, typically a copy sheet, during transfer. And where the copying or printing machine is a full color machine in which sequential application of multiple colors with a like number of passes through the machine xerographic system is used, exact registration of each of the colors with respect to one another is essential. However, registration of the developed image with the copy substrate, and with one another in the case of multiple pass systems, becomes increasingly difficult as printing resolution and speeds increase. And in the case of multiple pass systems such as color machines, this difficulty is exacerbated by the need to reproduce half and continuous toned documents. In the case of color, present day systems typically employ only functional quality color and thus open-loop paper and photoreceptor position control is acceptable. But in the future, a closed loop system will probably be needed to achieve the exact control over paper and photoreceptor positions required.

In the prior art, U.S. Pat. No. 3,914,047 to Hunt Jr. et al discloses a mechanical switch type sensor, the actuating arm of which rides against perforations in a copier web to produce signals representative of web movement, with control means responsive to the signals to actuate copier work stations in timed relation to movement of image areas. Another prior art patent to Luscher U.S. Pat. No. 4,017,014 discloses concern over registration of the frames of a film web during printing. Luscher provides what appears essentially to be a mechanical system in the form of a displaceable arm which rides against the edge of the film strip to sense the presence of notches or cutouts therein. Thus, in Luscher, when a notch in the film strip passes by, the arm drops into the notch. Due to the resulting interengagement between the moving web and the arm, the arm is temporarily displaced, such displacement activating a switch indicating the presence of a notch and hence the position of the web.

Other prior art concerns itself with the position of sheets or documents such as Dorn U.S. Pat. No. 4,518,862 in which CCD's are employed to detect the position of a sheet on a sheet support so that the plot head of an X-Y plotter can be positioned with respect thereto, Janssen et al U.S. Pat. No. 4,438,917 in which a sheet feeder has sheet position sensors to detect sheet position with independently driven feed rolls used to adjust the sheet alignment as required, Schon et al U.S. Pat. No. 4,360,195 in which sensors are used to locate the position of a document in a document feeding device with suction and air means to move the sheet and correct any sheet misalignment detected, Eertink et al U.S. Pat. No. 4,478,405 in which a sensor is used to detect the edge of a document original on the first feed or pass with the information obtained used to generate position correcting signals in the event the document original strays during subsequent passes, and Pfizenmaier U.S. Pat. No. 4,527,069 in which there is provided means to sense the position of a web of printable material with a mechanism to adjust web position in the event the web has moved out of position.

In contrast to the prior art, the present invention relates to a system for timing the recording member of a printing machine in order to provide clock signals for use in maintaining the operating speeds of related machine components synchronized with the recording member despite changes in recording member speed, the invention comprising, in combination: a series of discrete imaging marks arranged in at least one row on the recording member, the row of marks extending in a direction parallel to the direction of movement of the recording member; an array having a row of discrete image sensors, the longitudinal axis of the sensor row being parallel to the direction of movement of the recording member with the array positioned on one side of the recording member so that the sensor row is opposite the path of travel of the row of image generating marks; illumination means to illuminate the sensor row on the opposite side of the recording member; means for actuating the array to cause the sensors to repeatedly scan the row of marks as the recording member moves therepast and provide on each scan image signals representing the image content of that part of the row of signals viewed by the sensors, the image content varying as the marks change position with movement of the recording member; and means for converting the image signals into a succession of clock pulses representative of recording member position and velocity of use in synchronizing the operating speeds of related machine components with the recording member.

IN THE DRAWINGS

While the present invention will hereinafter be described in connection with preferred embodiments thereof, it will be understood that it is not intended to limit the invention to those embodiments. On the contrary, it is intended to cover all alternatives, modifications, and equivalents as may be included within the spirit and scope of the invention as defined by the appended claims.

Figure 1:
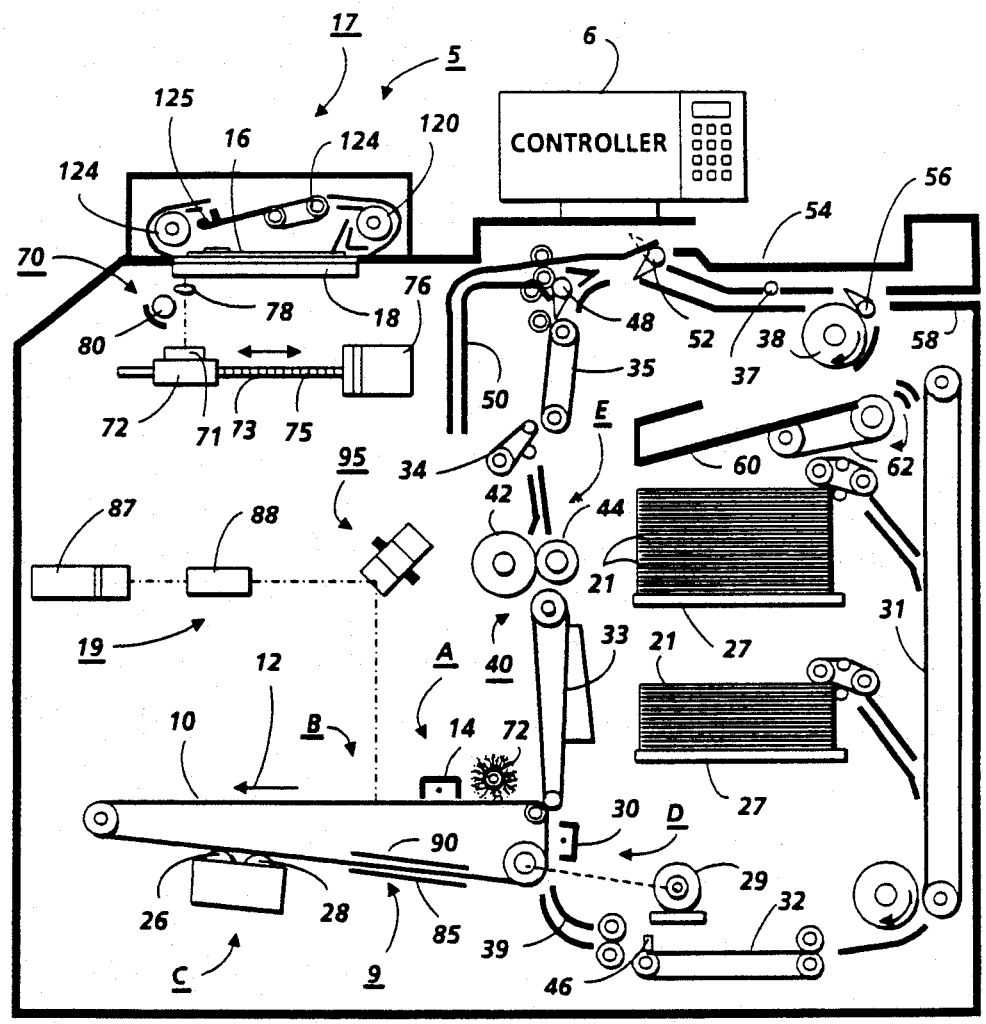
FIG. 1 is a schematic view of an exemplary xerographic printing machine in which the motion sensor of the present invention functions as the machine encoder.

For a general understanding of the features of the present invention, reference is made to the drawings. In the drawings, like reference numerals have been used throughout to designate identical elements. FIG. 1 schematically depicts the various components of an illustrative electrophotographic printing machine 5 incorporating the sensor apparatus 9 of the present invention therein. It will become evident from the following discussion that sensor apparatus 9 is equally well suited for use in a wide variety of printing machines and is not necessarily limited in its application to the particular embodiment shown herein.

Inasmuch as the art of electrophotographic printing is well known, the various processing stations employed in the printing machine 5 will be shown hereinafter schematically and their operation described briefly with reference thereto.

The illustrative electrophotographic printing machine 5 employs a recording member in the form of a photoreceptor belt 10 having a photoconductive surface thereon. Preferably, the photoconductor surface of photoreceptor 10 is made from a selenium alloy. Photoreceptor 10 is driven by a main drive motor 29 and moves in the direction of arrow 12 to advance successive portions of the photoconductive surface through the various processing stations disposed about the path of movement thereof.

Initially, a portion of the photoconductive surface passes through charging station A. At charging station A, a corona generating device, indicated generally by the reference numeral 14, charges the photoconductive surface to a relatively high substantially uniform potential.

Next, the charged portion of the photoconductive surface is advanced through imaging station B where latent electrostatic images of the copy being printed are produced on the photoconductive surface of photoreceptor 10 as will appear more fully hereinbelow.

A plurality of sheet transports comprising a vertical transport 31, a registration transport 32, pre-fuser transport 33, decurler 34, a post fuser transport 35, output transport 37, and inverter roll 38, cooperate with suitable sheet guides 39 to form a paper path through which the copy sheets 21 being processed pass from either main paper supply tray 27, or auxiliary paper supply tray 27', or duplex paper supply tray 60 through the machine 5 to either top tray 54 or discharge path 58. Transports 31, 32, 33, 34, 35, 37, 38 are suitably driven by main drive motor 29. Suitable sheet sensors are provided to monitor movement of the copy sheets in the system.

At development station C, a pair of magnetic brush developer rollers, indicated generally by the reference numerals 26 and 28, advance a developer material into contact with the electrostatic latent image. The latent image attracts toner particles from the carrier granules of the developer material to form a toner powder image on the photoconductive surface of photoreceptor 10.

After the electrostatic latent image recorded on the photoconductive surface of photoreceptor 10 is developed, the toner powder image is carried to transfer station D. At transfer station D, a copy sheet is moved into transfer relation with the toner powder image. Transfer station D includes a corona generating device 30 which sprays ions onto the backside of the copy sheet. This attracts the toner powder image from the photoconductive surface of photoreceptor 10 to the sheet. After transfer, pre-fuser transport 33 advances the sheet to fusing station E.

Fusing station E includes a fuser assembly, indicated generally by the reference numeral 40, which permanently affixes the transferred powder image to the copy sheet. Preferably, fuser assembly 40 includes a heated fuser roller 42 and backup roller 44. The sheet passes between fuser roller 42 and backup roller 44 with the powder image contacting fuser roler 42. In this manner, the powder image is permanently affixed to the sheet.

After fusing, decurler 34 and post fuser transport 35 carry the sheets to inverter gate 48 which functions as an inverter selector. When energized or pulled, gate 48 directs the copy sheets into a sheet inverter 50. When inoperative, gate 48 bypasses sheet inverter 50 and the sheets are fed directly to bypass gate 52. Thus, copy sheets which bypass inverter 50 turn a 90° corner in the paper path before reaching gate 52. Bypass gate 52 directs the sheets into top tray 54 so that the imaged side which has been transferred and fused is faceup. If the inverter 50 is selected, the opposite is true, i.e. the last printed face is facedown. Bypass gate 52 normally directs the sheet into top tray 54 or, when energized, to output transport 37 which carries the sheet to duplex gate 56. Gate 56 either directs the sheets without inversion to the discharge path 58 or, when energized, to duplex inverter roll 38. Inverter roll 38 inverts and directs the sheets to be duplexed into duplex tray 60. Duplex tray 60 provides intermediate or buffer storage for those sheets which have been printed on one side and on which an image will be subsequently printed on the side opposed thereto, i.e. the copy sheets being duplexed. Due to the sheet inverting action of inverter roll 38, the buffer set of sheets are stacked in duplex tray 60 facedown in the order in which the sheets have been copied.

In order to complete duplex copying, the previously simplexed sheets in tray 60 are fed seriatim by bottom feeder 62 back via vertical transport 31 and registration transport 32 to transfer station D for transfer of the toner powder image to the opposed side of the sheet. Inasmuch as the bottommost sheet is fed from duplex tray 60, the proper or clean side of the copy sheet is positioned in contact with photoreceptor 10 at transfer station D so that the toner powder image thereon is transferred thereto. The duplex sheets are then fed through the same path as the previously simplexed sheets to the selected output for subsequent removal by the printing machine operator.

An input scanner section 17 employs one or more linear scanning arrays 71 which may for example comprise charge couple devices (CCD) supported below and in scanning relation to a transparent platen 18 by a carriage 72. Carriage 72 is in turn supported for reciprocating movement along a path paralleling platen 18 by rails 73. A drive screw 75 serves to move carriage 72 along rails 73, screw 75 being driven by a reversible motor 76 which selectively moves carriage 72 in either a forward or reverse scanning direction. A suitable lens 78 is provided to focus array 71 on a line-like segment of platen 18 and the document 16 resting thereon. A suitable lamp 80 illuminates the document line being scanned.

Array 71 provides electrical image signals or pixels representative of the document image scanned which, after suitable processing, are input to a suitable memory (not shown) where the signals are stored pending use. As will be understood, the image signals may be used for purposes other than printing copies, as for example, the signals may be sent via a communication channel (not shown) to another location, or stored, etc.

Documents 16 to be scanned are brought from a document tray 125 forward by the document handlers 120, 124 into position on platen 18 for scanning. Following scanning, the document is returned to the document tray 125.

While a particular document handler is shown, one skilled in the art will appreciate that other document handler types may be used instead or that the documents may be placed on the platen 18 manually.

A machine controller (not shown), which controls operation of machine 5, has one or more microprocessors together with suitable memory for storing machine operating programs and operator instructions. The various operating components and sections of machine 5 are linked together as by means of communication channel.

A raster output scanner section 19 includes a suitable source of high intensity light such as laser 87 modulated in accordance with the content of the image signals as by an acousto-optic modulator 88 to provide zero and first order imaging beams. The imaging beam is scanned across photoreceptor 10 at exposure station B by a scanning polygon 95 to expose the previously charged photoreceptor and create a latent electrostatic image of the document represented by the image signals input to modulator 88. Suitable optical means (not shown) are provided to focus the beam on photoreceptor 10.

A control panel 6 allows the use or operator to select various printing functions and printing function combinations which the machine is capable of performing such as copy size, copy contrast, number of copies, the manner (duplex, for example) in which the copies are to be made, etc.

Figure 2:
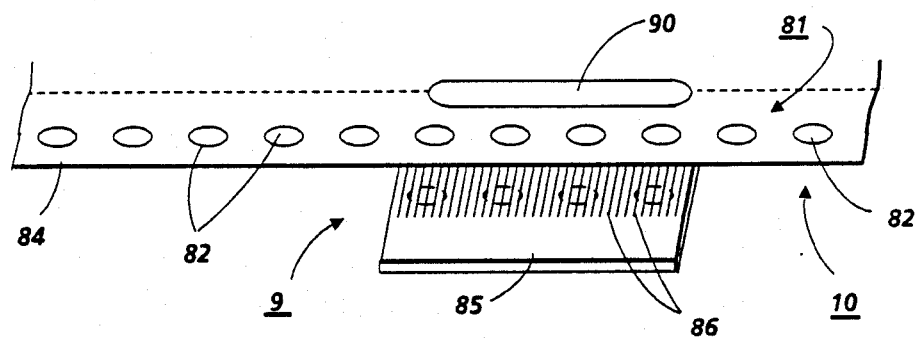
FIG. 2 is an isometric view depicting the motion sensor scanning array and light bar in operative juxtaposition to the machine recording member, the part of the recording member scanned being provided with a series of holes along one edge, the motion sensor converting the recording member position and velocity to machine clock signals.

Referring particularly to FIG. 2, photoreceptor 10 is provided with a row 81 of fiducial marks in the form of holes 82. Holes 82 are placed along one side or margin 84 of photoreceptor 10 outside the area used for imaging. Row 81 of holes 82 preferably extends around the circumference of photoreceptor 10.

Motion sensor 9 has a scanning array of sensor 85 such as a CCD having a preset minimum number of photosites such as photodiodes 86 arranged in a linear row or array. Array 85 is suitably mounted on machine 5 in predetermined spaced relation opposite margin 84 of photoreceptor 10 and in line with the path of travel of holes 82 in photoreceptor 10. The longitudinal axis of the row of photodiodes 86 is substantially parallel with the axis of movement of holes 82. Preferably, the optical axis of photodiodes 86 is aligned with the center of holes 82.

An elongated light bar 90 is suitably mounted in machine 5 on the side of photoreceptor 10 opposite array 85 and in predetermined spaced relation with photoreceptor 10. The operating length of light bar 90 is at least sufficient to provide substantially equal illumination to each of the photodiodes 86, with the longitudinal axis of bar 90 being substantially parallel with the longitudinal axis of the array 85 therebelow.

While holes 82 are illustrated and described herein, other transparent or translucent fiducial marks may be envisioned. The fiducial marks such as holes 82 in photoreceptor 10 do not require precise cutting or placement. Instead, the accuracy of resolution is determined by the placement of photodiodes 86 on array 85 which as will be understood by those skilled in the art is extremely precise. However, it is necessary that the number and disposition of the fiducial marks such as holes 82 and the length of the array of photodiodes 86 of array 85 be such that the maximum spacing between any two adjacent holes 82 is less than the length of the array of photodiodes 86.

Figure 3:
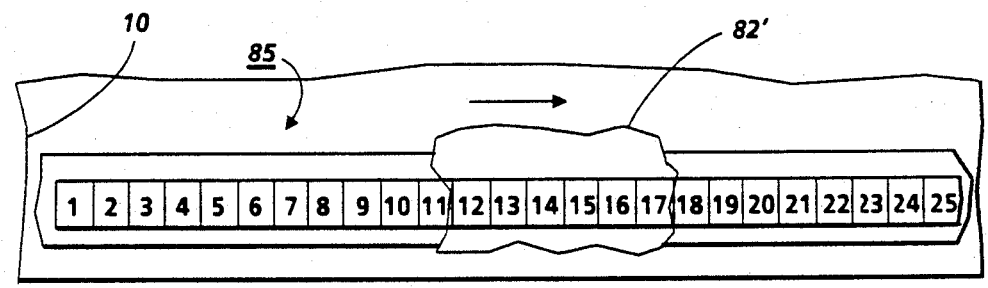
FIG. 3 is a schematic view depicting a positional relationship between a hole in the machine recording member and the photodiodes of the motion sensor scanning array at an instant in time.
Figure 4:
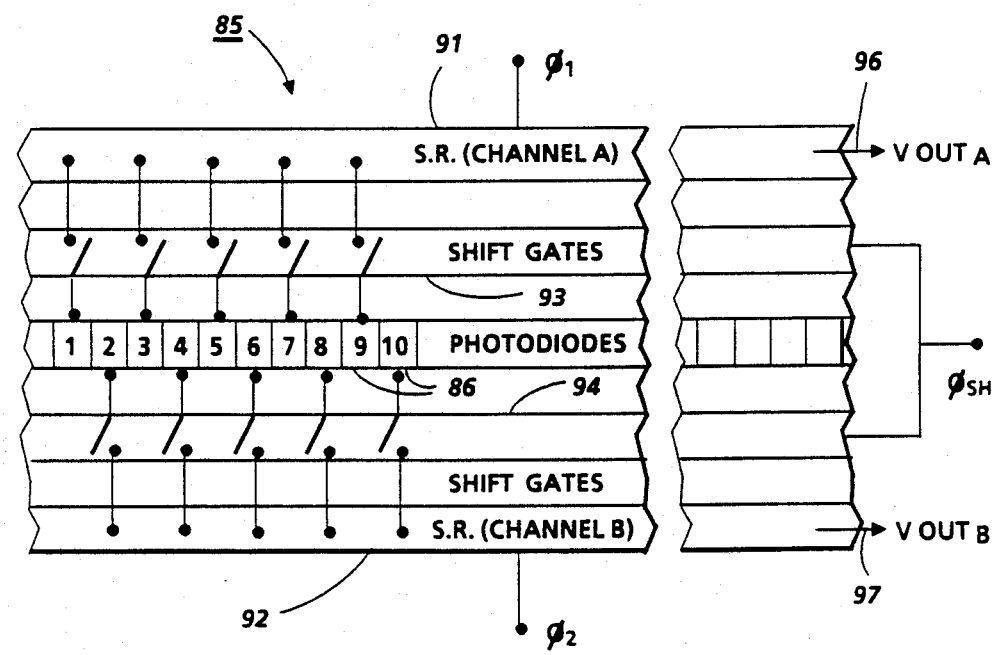
FIG. 4 is a view showing the component parts of a typical scanning array.
Figure 5:
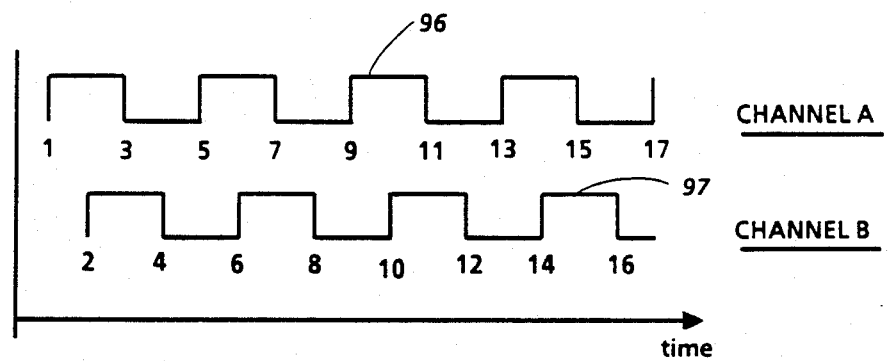
FIG. 5 is a timing chart illustrating examples of the quadrature signal output of the motion sensor scanning array.

Referring now to FIGS. 3, 4 and 5, there is illustrated the manner in which a single hole (identified by numeral 82') in photoreceptor 10 moving at constant velocity past array 85 can generate a clock signal suitable for use in maintaining the operating speeds of related machine components. As will be understood and referring now particularly to FIG. 4, array 85 includes a pair of analog shift registers 91, 92 coupled to the odd and even numbered photosites 86 of array 85 through shift gates 93, 94 respectively. Following an integration period ($\Phi_{SH}$) shift gates 93, 94 are actuated to transfer the charges accumulated on the odd/even photodiodes 86 of array 85 to odd/even shift registers 91, 92 (channel A, channel B) respectively. While the next integration cycle is being carried out, the charges from the previous integration are clocked out of shift registers 91, 92 by convert signals $\Phi_1 \Phi_2$ to provide clock signals in the form of quadrature signals 96, 97 (shown in FIG. 5). Because of the precision in making the photodiode array 85, the clock signals generated possess two channels (i.e., channel A, channel B) in quadrature with each having a 50% duty cycle as illustrated in FIG. 5.

Figure 6:
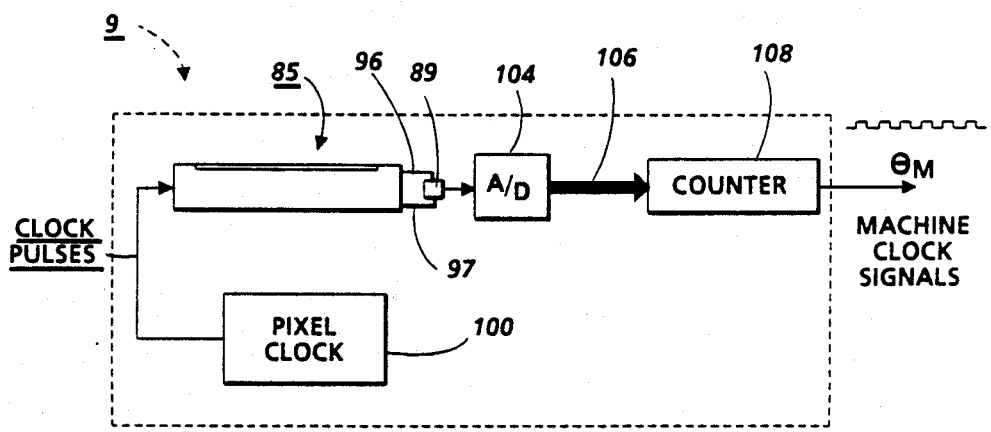
FIG. 6 is a schematic block diagram showing details of the motion sensor of the present invention.

Referring now to FIG. 6, the quadrature signals 96, 97 output of array 85 are multiplexed by a multiplexer 89 to provide a stream of clock signals which are input to a suitable A/D converter 104 which converts the analog image signals output to multi-bit digital signals. The digital signals from converter 104 are output through bus 106 to a suitable counter 108. Counter 108 alternates high/low outputs each time there is a change in the digitized signal input thereto so that there is provided square wave machine clock pulses $\theta_m$ at the output of counter 108 for use in clocking and synchronizing machine operation.

Since pixel clock 100 of array 85 operates at a fixed frequency, the frequency of the clock pulses $\theta_m$ output by counter 108 will remain constant so long as the speed of the photoreceptor 10 remains constant. Should the speed of photoreceptor 10 change, that is, either increase or decrease, the frequency of the clock pulses $\theta_m$ output by array 85 undergoes a corresponding change to maintain operating synchronism between the machine components and the photoreceptor 10.

Figure 7:
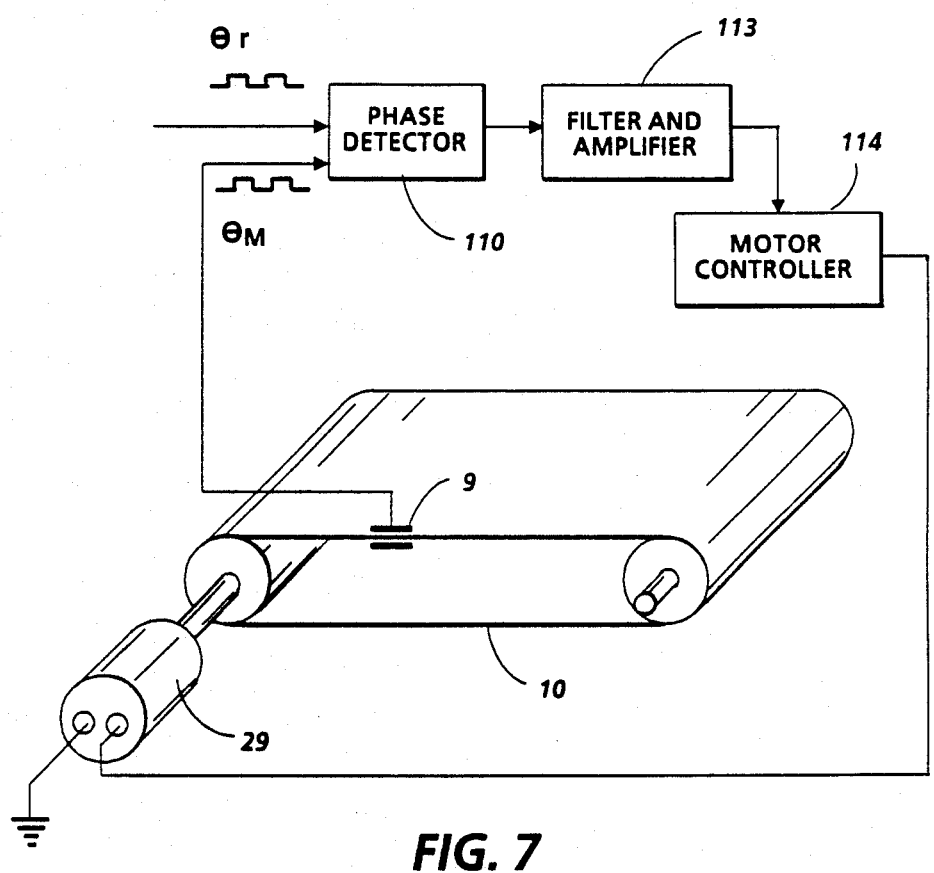
FIG. 7 is a schematic view illustrating an analog phase lock system for controlling the driving speed of the recording member motor in accordance with the signal output of the motion sensor of the present invention.

Referring now to FIG. 7, there is shown an analog phaselocked servo system for controlling the velocity of the photoreceptor 10 employing motion sensor 9. The signal output $\theta_m$ of motion sensor 9 is input to one terminal of a suitable phase detector 110. A suitable reference clock signal $\theta_r$ is provided as the target signal to be followed and is input to the second terminal of phase detector 110. The error signal output by phase detector 110, after suitable filtering and amplification by circuit 113, is fed to controller 114 for motor 29. Controller 114 adjusts the speed of motor 29 and hence the motion of photoreceptor 10 in accordance with the signal output of phase detector 110 in such a way that both signals will have the same frequency and a constant phase difference.

Figure 8:
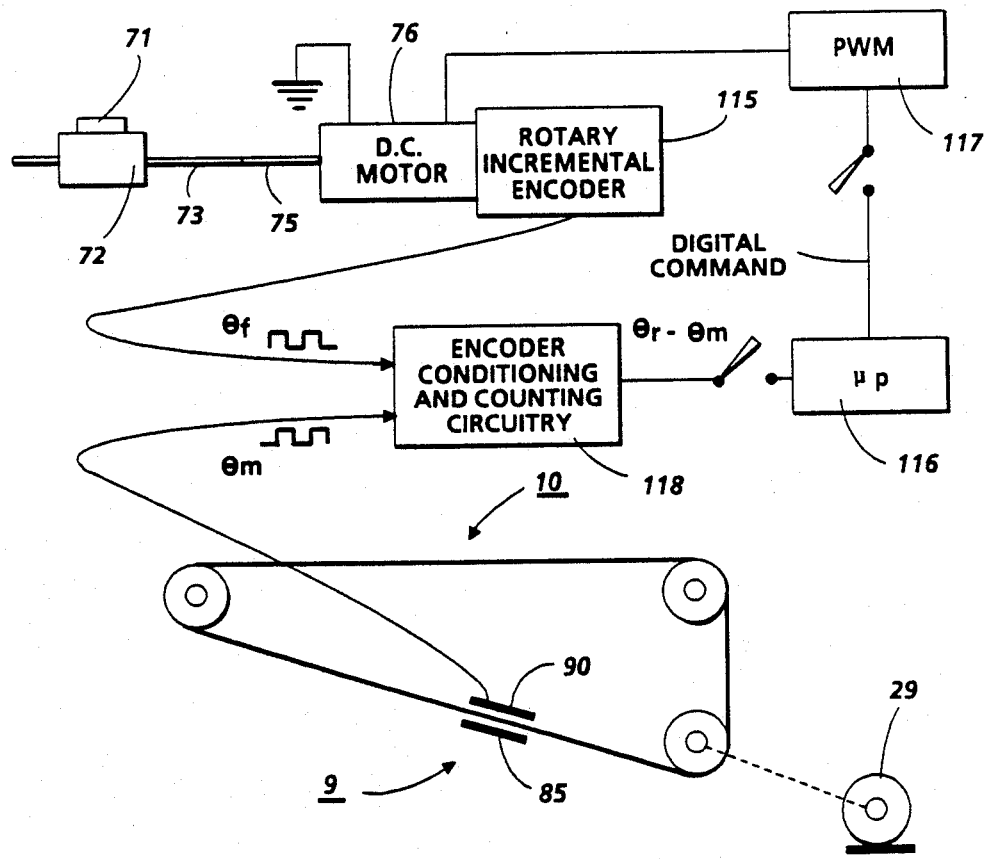
FIG. 8 is a schematic view illustrating an analog phase-lock loop motion control system employing the motion sensor of the present invention in which motion of the input scanner carriage is used to track the position of the recording member.

In FIG. 8, an analog phase-lock loop motion control system is shown wherein the motion of carriage 72 of input scanner section 17 is used to track the position of photoreceptor 10. In this case, photoreceptor 10 is driven in an open loop fashion by the main drive motor 29. Motion sensor 9 encodes the photoreceptor motion and provides a TTL compatible, dual channel quadrature signal, $\theta_m$. Using commonly available hardware, the signal output $\theta_m$ of sensor 9 is conditioned and compared to a similar feedback signal $\theta_f$ from a suitable incremental encoder 115 mounted on the D.C. motor 76 which drives the scanning carriage 72. The signals $\theta_m$ and $\theta_f$ are input to a suitable encoder conditioning and counting circuit 118, the output of which is a digital number that represents the difference in position $(\theta_m-\theta_f)$ between the target (photoreceptor 10) and the object (scanning carriage 72). The output of circuit 118 is sampled by a microprocessor 116 and used wtihin a software position compensation algorithm to produce a digital command for a suitable Pulse Width Modulator (PWM) amplifier 117. The output of amplifier 117 produces the voltage control signal for operating motor 76 and controlling the speed of carriage 72 of input scanner section 17.

Figure 9:
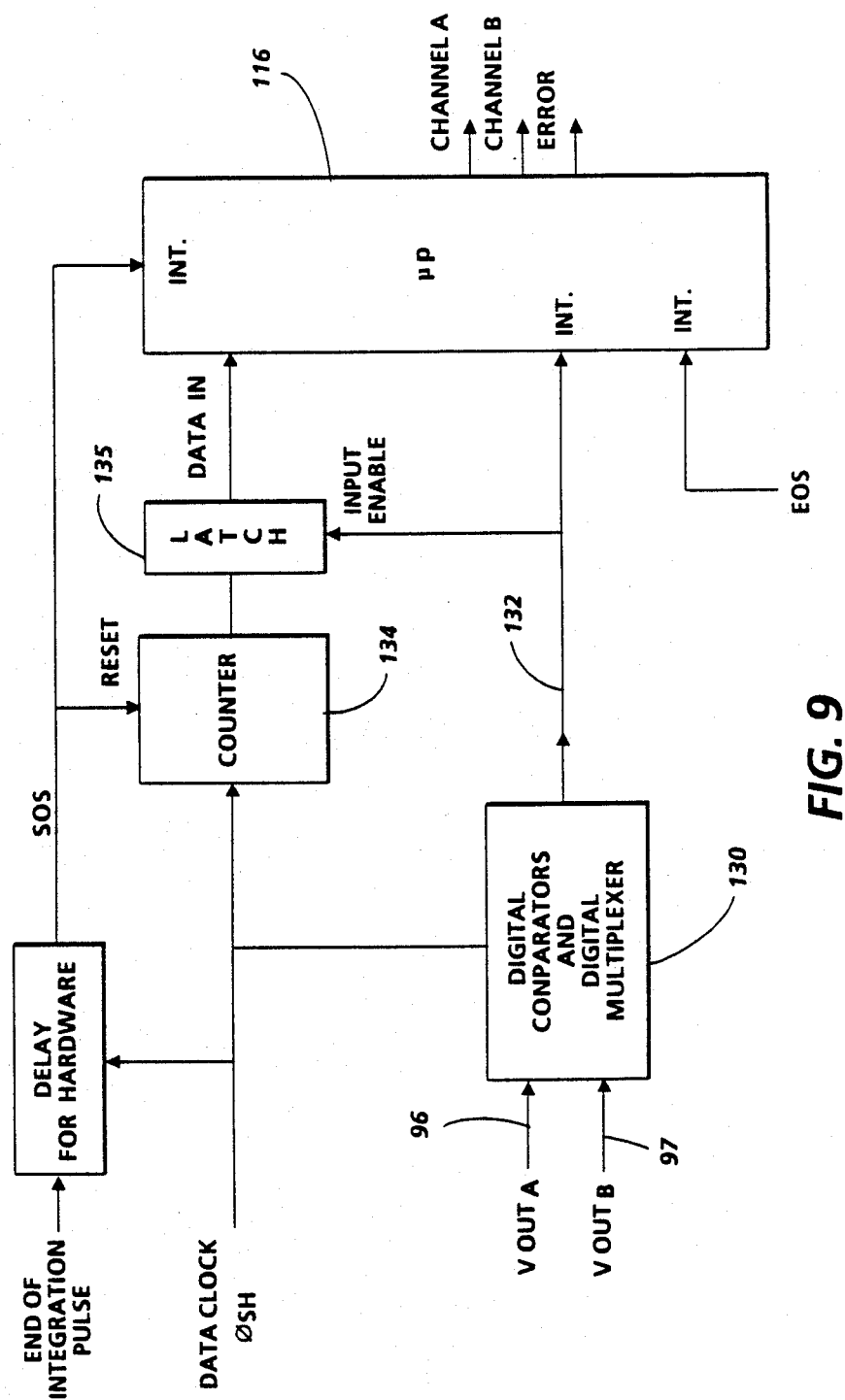
FIG. 9 is a schematic view illustrating a sampled-data microprocessor controlled position tracking system employing the motion sensor of the present invention.
Figure 10:
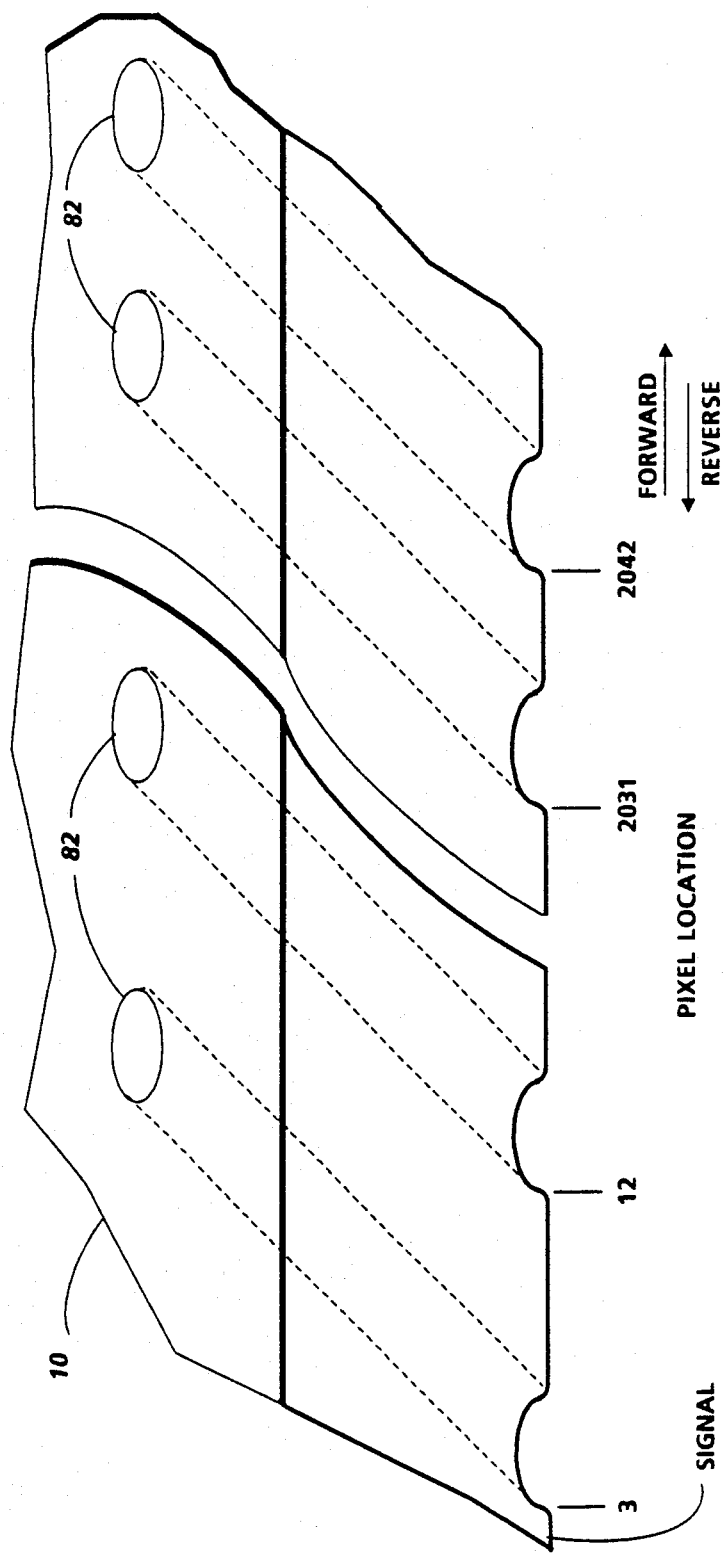
FIG. 10 is a schematic view showing a section of the recording member with the signal output resulting from scanning holes in the recording member superimposed thereon.

Referring now to FIG. 9, there is illustrated a functional block diagram representation of a sampled-data, microprocessor controlled, position tracking system. Here, the analog signal produced by four holes 82 exposed by light source 90 as seen in FIG. 10 is used as an example. It is assumed that the transitions from dark to light caused by the four photoreceptor holes occur at pixels 3, 12, 2031, and 2042.

As seen in FIG. 4, array 85 has separate taps for odd and even pixels with odd pixels transferring their charge to analog shift register 91 and even pixels transferring their charge to analog shift register 92. As seen in FIG. 9, the two analog voltage outputs from the array ($VOUT_A$ and $VOUT_B$) are digitized and combined by a suitable digital comparator and digital multiplexer circuit 130 to form a single composite digital video signal in line 132. Upon the occurrence of a transition from dark to light as, for instance, occurs at pixel 3 in FIG. 10, the composite digital video signal in line 132 will go from low to high, causing an interrupt (Int.) in microprocessor 116 and latching a suitable counter 134. Counter 134 is reset by a signal (SOS) at the Start Of Scan (SOS) which marks the interrogation of the first pixel in array 85. The clock signal $\Phi_{SH}$, which is used to transfer out the odd and even pixels to their respective transport shift registers 91, 92, is input to the counter 134. Accordingly, on the low-to-high transition at pixel 3 for example, a latch 135 holds the count 3 and microprocessor 116 is told, via the sigal change in line 132, that a transition has occurred. Microprocessor 116 responds by acquiring and processing the number in latch 135. At the End Of Scan (EOS) signal from array 85, signifying that the last photodiode 86 on the array has been interrogated, microprocessor 116 stores the number of transitions that have occurred. For the example shown here, the microprocessor has stored away the numbers 3, 12, 2031, and 2042.

After occurrence of the End Of Scan (EOS) signal, an integration period is allowed for the photodiodes 86 of array 85 to once again build up charge in response to the incident light thereon. During this period, microprocessor 116 evaluates the data received from the full interrogation of the array and compares the most recent data to data from the previous interrogation, and as necessary, toggles either channel A or B signifying both incremental motion and sense of direction of a displacement equal to the physical size of a pixel on array 85, i.e., approximately 13 microns. At the end of the integration period, an external signal, the end of integration pulse, is generated to start the next interrogation of the array. At this point, the microprocessor evaluation algorithm is completed.

Figure 11:
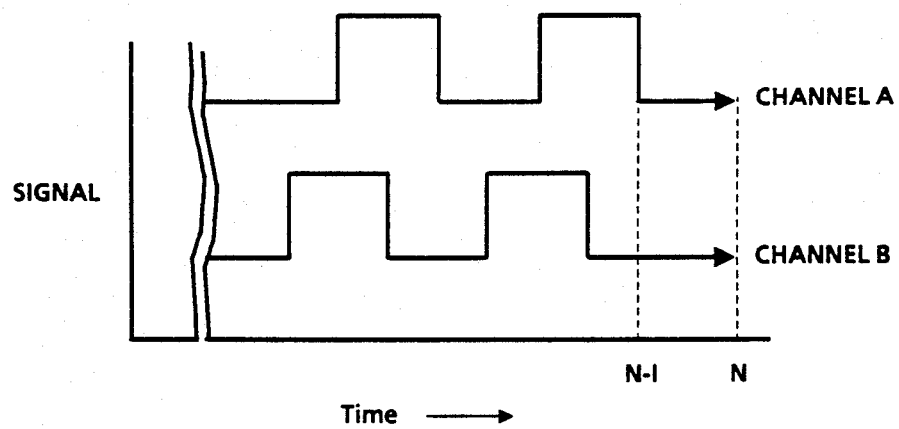
FIG. 11 is a timing chart showing microprocessor signal output representing both incremental motion of the recording member and direction of recording member motion following evaluation of the signal shown in FIG. 10.

For the evaluation algorithm used by microprocessor 116, assume for example that channel A has just been set low as seen in FIG. 11 (at N-1) as the result of the previous interrogation (N-1) of the full array. Assume also that in the previous interrogation, there were also 4 low-to-high interfaces present on the array occurring at pixels 2, 12, 2031, and 2042. The total of these pixel values is called the checksum. In this example, the checksum$_{N-1}$ is equal to 4087, while the checksum for the current line is 4088, i.e., checksum$_N$=4088. Also shown in FIG. 10 is the convention for forward and reverse motion. In this example, the number of transitions on the array during the Nth interrogation is the same as during the N-1th interrogation, namely 4. If M is the number of transitions, the evaluation algorithm to be followed after the End Of Scan (EOS) signal is received is as follows:

(1) if M$\leq$(checksum$_N$−checksum$_{N-1}$)<2M, then change the state of channel B (set channel B high) because photoreceptor 10 has moved one pixel's width of displacement in the forward direction and update the checksum by letting checksum$_{N-1}$=checksum$_{N-1}$+M.

(2) if −2M <(checksum$_N$−checksum$_{N-1}$)$\leq$−M, then change the state of channel A (set channel A high) because photoreceptor 10 has moved one pixel's width of displacement in the reverse direction and update the checksum by letting checksumN-1 =checksum$_{N-1}$−M.

(3) if −M <(checksum$_N$−checksum$_{N-1}$)<M then do not change state of either channel A or channel B and do not update the checksum because photoreceptor 10 hasn't yet moved a full pixel's width of displacement in either the forward or reverse direction.

(4) if (checksum$_N$−checksum$_{N-1}$)$\geq$2M, or if (checksum$_N$−checksum$_{N-1}$)$\leq$−2M, then indeterminate motion of more than one pixel's width of displacement has occurred so set the error flag.

In the above algorithm the number of transitions was the same for two consecutive full interrogations. As the holes 82 are continuously moving across photoreceptor 10, the algorithm must accommodate increases or decreases in the number of transitions with the possibility of holes entering or leaving array 85 from either end, i.e., forward or reverse motion. Consider first the case where the number of transitions have increased by one since the last full interrogation, i.e., $M_N=M_{N-1}+1$, indicating that a new hole has entered the array. If the new transition entered from the left in FIG. 10, indicating forward motion, the checksum$_N$ is calculated in the usual way and the aforementioned algorithm is used with $M_N$ instead of $M_{N-1}$. If the new transition entered from the right, indicating reverse motion, the current checksum$_N$ is calculatd in the normal fashion and $M_N$ is once again used. In addition, the previous checksum$_{N-1}$ must be incremented by 2048, i.e., checksum$_{N-1}$=checksum$_{N-1}$+2048, and then the aforementioned algorithm is used in the normal way.

Consider the case that the number of transitions have decreased since the last full interrogation, i.e., $M_N = M_{N-1} - 1$, indicating that a hole has exited from array 85. If the hole exited from the left in FIG. 10, indicating reverse motion, then the previous checksum$_{N-1}$ must be decremented by 1, i.e., checksum$_{N-1}$=checksum$_{N-1}$−1. If the hole exited from the right, indicating forward motion, then the previous checksum, i.e., checksum$_{N-1}$, is decremented by 2047, i.e., checksum$_{N-1}$=checksum$_{N-1}$−2047 and the algorithm is used in the normal manner.

While the foregoing apparatus contemplated the use of a commercially available CCD type array for array 85, other linear photodiode arrays may be used as is obvious to one skilled in the art of motion control. As an alternative, use of a custom photodiode array that is much less dense than the typical commercially available array may be envisioned using well known grey level techniques for evaluating pixel status with respect to holes and incident light. In the preceding embodiments, the two video channels ($V_{outA}$, $V_{outB}$) were digitized and multiplexed by circuit 130 to form a composite digital video signal. In this case, each pixel was then interpreted in a binary sense as being on or off. However, no information about movement between pixels was obtained since the small size of the pixels (approximately 13 microns) was sufficient.

Where a less dense custom photodiode array (for example, an array having a density of 128 photosites/inch) is used, the grey level reading would work basically in a manner similar to that illustrated above except that now an 8-bit analog-to-digital converter is used to measure the exposure of each pixel. This effectively breaks each pixel up into 256 parts thus ensuring a sufficient resolution. The use of this or other such examples for encoding the motion of a photoreceptor past a stationary linear array is, as will be understood by those skilled in the art, a straight forward application of the principles explained above.

While the invention has been described with reference to the structure disclosed, it is not confined to the details set forth, but is intended to cover such modifications or changes as may come within the scope of the following claims.

We claim:

1. In a printing machine having a movable recording member, the combination of:
   (a) a series of discrete fiducial marks arranged in at least one row about the circumference of said recording member, said row of marks extending in a direction parallel to the direction of movement of said recording member;
   (b) a stationary array having at least one row of image sensors, the longitudinal axis of said array being parallel to the direction of movement of said recording member with said array positioned so that said row of sensors view a portion of said recording member including at least two of said marks;
   (c) means for operating said array to repeatedly scan said recording member portion and the marks currently viewed by said row of sensors whereby to output on each scan a block of image signals representing the image presented by said recording member portion with said marks, said image changing as said recording member with said row of marks moves past said array; and
   (d) means for converting said blocks of image signals into a clock signal representative of the velocity of said recording member.

2. The machine according to claim 1 including
   a motor for moving said recording member; and
   control means for controlling said motor in response to said clock signals to maintain said recording member at a substantially constant speed.

3. The machine according to claim 1 including
   lamp means for illuminating said recording member portion.

4. The machine according to claim 1 in which said row of marks comprise a series of holes in said recording member along one side margin of said recording member.

5. The machine according to claim 1 in which said marks are transparent; and
   light means on the side of said recording member opposite said array for illuminating said marks for viewing by said array image sensors.

6. In a printing machine having a movable recording member, the combination of:
   (a) a series of discrete fiducial marks arranged in at least one row about the circumference of said recording member, said row of marks extending in a direction parallel to the direction of movement of said recording member;
   (b) a stationary array having at least one row of image sensors, the longitudinal axis of said array being parallel to the direction of movement of said recording member with said array positioned so that said row of sensors view a portion of said recording member including at least two of said marks;
   (c) means for operating said array to repeatedly scan said recording member portion and the marks currently viewed by said row of sensors whereby to output on each scan a block of image signals representing the image presented by said recording member portion with said marks, said image changing as said recording member with said row of marks moves past said array; and
   (d) means for converting said image signals into position control signals representing the instantaneous position of said recording member.

7. The machine according to claim 6 in which said marks each comprise an image of predetermined size, said converting means including means for effectively subdividing each of said image sensors into a plurality of incremental scan areas to enable said image sensors to read partially exposed marks.

* * * * *